United States Patent
Jain et al.

(10) Patent No.: US 9,477,289 B2
(45) Date of Patent: Oct. 25, 2016

(54) DYNAMIC POWER ALLOCATION BASED ON PHY POWER ESTIMATION

(71) Applicant: Advanced Micro Devices, Inc., Sunnyvale, CA (US)

(72) Inventors: Ashish Jain, Austin, TX (US); Alexander J. Branover, Chestnut Hill, MA (US); Guhan Krishnan, Chelmsford, MA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 276 days.

(21) Appl. No.: 14/225,244

(22) Filed: Mar. 25, 2014

(65) Prior Publication Data
US 2015/0277521 A1 Oct. 1, 2015

(51) Int. Cl.
*G06F 1/32* (2006.01)

(52) U.S. Cl.
CPC ............ *G06F 1/3225* (2013.01); *G06F 1/324* (2013.01); *G06F 1/3296* (2013.01); *Y02B 60/1217* (2013.01)

(58) Field of Classification Search
CPC ...... G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| 8,271,806 B1* | 9/2012 | Xiao | G06F 1/3212 713/300 |
|---|---|---|---|
| 2005/0268123 A1* | 12/2005 | Arakawa | G06F 1/3203 713/300 |
| 2008/0288123 A1 | 11/2008 | Krishnan et al. | |
| 2009/0077407 A1* | 3/2009 | Akimoto | G06F 1/26 713/340 |
| 2010/0115304 A1* | 5/2010 | Finkelstein | G06F 1/206 713/320 |
| 2010/0332871 A1* | 12/2010 | Allalouf | G06F 9/5094 713/320 |
| 2011/0022857 A1* | 1/2011 | Nussbaum | G06F 1/3203 713/300 |
| 2011/0264934 A1 | 10/2011 | Branover et al. | |
| 2012/0102344 A1 | 4/2012 | Kocev et al. | |
| 2012/0324258 A1 | 12/2012 | Branover et al. | |
| 2013/0145180 A1 | 6/2013 | Branover et al. | |
| 2013/0159739 A1 | 6/2013 | Bircher et al. | |
| 2013/0159755 A1 | 6/2013 | Presant et al. | |
| 2013/0198538 A1* | 8/2013 | Diab | G06F 1/3278 713/310 |
| 2013/0246820 A1 | 9/2013 | Branover et al. | |
| 2013/0275778 A1 | 10/2013 | Steinman et al. | |
| 2013/0283078 A1 | 10/2013 | Branover et al. | |
| 2014/0040648 A1* | 2/2014 | Miller | G06F 1/3203 713/323 |

(Continued)

OTHER PUBLICATIONS

Heather Hanson & Karthick Rajamani, What Computer Architects Need to Know About Memory Throttling. Jun. 17, 2010, HAL archives-ouvertes, HAL Id:inria-00492851.*

*Primary Examiner* — Zahid Choudhury
(74) *Attorney, Agent, or Firm* — Park, Vaughan, Fleming & Dowler LLP

(57) ABSTRACT

A system has a plurality of electronic components including a memory, a PHY coupled to the memory, and one or more other electronic components. Power consumed by the PHY is estimated during operation of the system. Estimating the power consumed by the PHY includes modeling the power consumed by the PHY as a linear function with respect to memory bandwidth. Available power for the PHY is determined based at least in part on the estimated power consumed by the PHY. At least a portion of the available power for the PHY is allocated to at least one of the one or more other components.

21 Claims, 4 Drawing Sheets

(56) References Cited

U.S. PATENT DOCUMENTS

2014/0068290 A1* 3/2014 Bhandaru ............... G06F 1/26
  713/320
2014/0143557 A1* 5/2014 Kuesel ..................... G06F 1/26
  713/300
2014/0159931 A1* 6/2014 Redfern ................ H03M 3/422
  341/143

* cited by examiner

DYNAMIC POWER ALLOCATION BASED ON PHY POWER ESTIMATION

TECHNICAL FIELD

The present embodiments relate generally to power management for integrated circuits, and more specifically to power management that includes power estimation for a physical-layer device (PHY).

BACKGROUND

A physical-layer device (PHY), such as a PHY coupling a memory controller with a memory, may consume a significant amount of the total power consumed in an electronic system. The PHY may be allocated a fixed power budget. The power actually consumed by the PHY, however, may vary depending on bandwidth associated with a workload running on the system.

SUMMARY OF ONE OR MORE EMBODIMENTS

Embodiments are disclosed in which unused, available power in the power budget for a PHY is allocated to one or more other components of a system, thereby boosting the performance of the one or more other components.

In some embodiments, a method of managing power is performed in a system with a plurality of electronic components including a memory, a PHY coupled to the memory, and one or more other electronic components. In the method, power consumed by the PHY is estimated during operation of the system. Estimating the power consumed by the PHY includes modeling the power consumed by the PHY as a linear function with respect to memory bandwidth. Available power for the PHY is determined based at least in part on the estimated power consumed by the PHY. At least a portion of the available power for the PHY is allocated to at least one of the one or more other components.

In some embodiments, a system has a plurality of electronic components that include a controller (e.g., a power management controller), a PHY to couple to a memory, and one or more other electronic components. The controller is to estimate power consumed by the PHY by modeling the power consumed by the PHY as a linear function with respect to memory bandwidth. The controller is also to determine available power for the PHY based at least in part on the estimated power consumed by the PHY and to allocate at least a portion of the available power for the PHY to at least one of the one or more other components.

In some embodiments, a non-transitory computer-readable storage medium stores one or more programs configured for execution by a controller (e.g., a power management controller) in a system. The system includes a plurality of electronic components including the controller, a PHY to couple to a memory, and one or more other electronic components. The one or more programs include instructions to estimate power consumed by the PHY during operation of the system. The instructions to estimate the power consumed by the PHY include instructions to model the power consumed by the PHY as a linear function with respect to memory bandwidth. The one or more programs also include instructions to determine available power for the PHY based at least in part on the estimated power consumed by the PHY and instructions to allocate at least a portion of the available power for the PHY to at least one of the one or more other components.

BRIEF DESCRIPTION OF THE DRAWINGS

The present embodiments are illustrated by way of example and are not intended to be limited by the figures of the accompanying drawings.

Like reference numerals refer to corresponding parts throughout the figures and specification.

DETAILED DESCRIPTION

Reference will now be made in detail to various embodiments, examples of which are illustrated in the accompanying drawings. In the following detailed description, numerous specific details are set forth in order to provide a thorough understanding of the disclosure. However, some embodiments may be practiced without these specific details. In other instances, well-known methods, procedures, components, and circuits have not been described in detail so as not to unnecessarily obscure aspects of the embodiments.

Figure 1A:
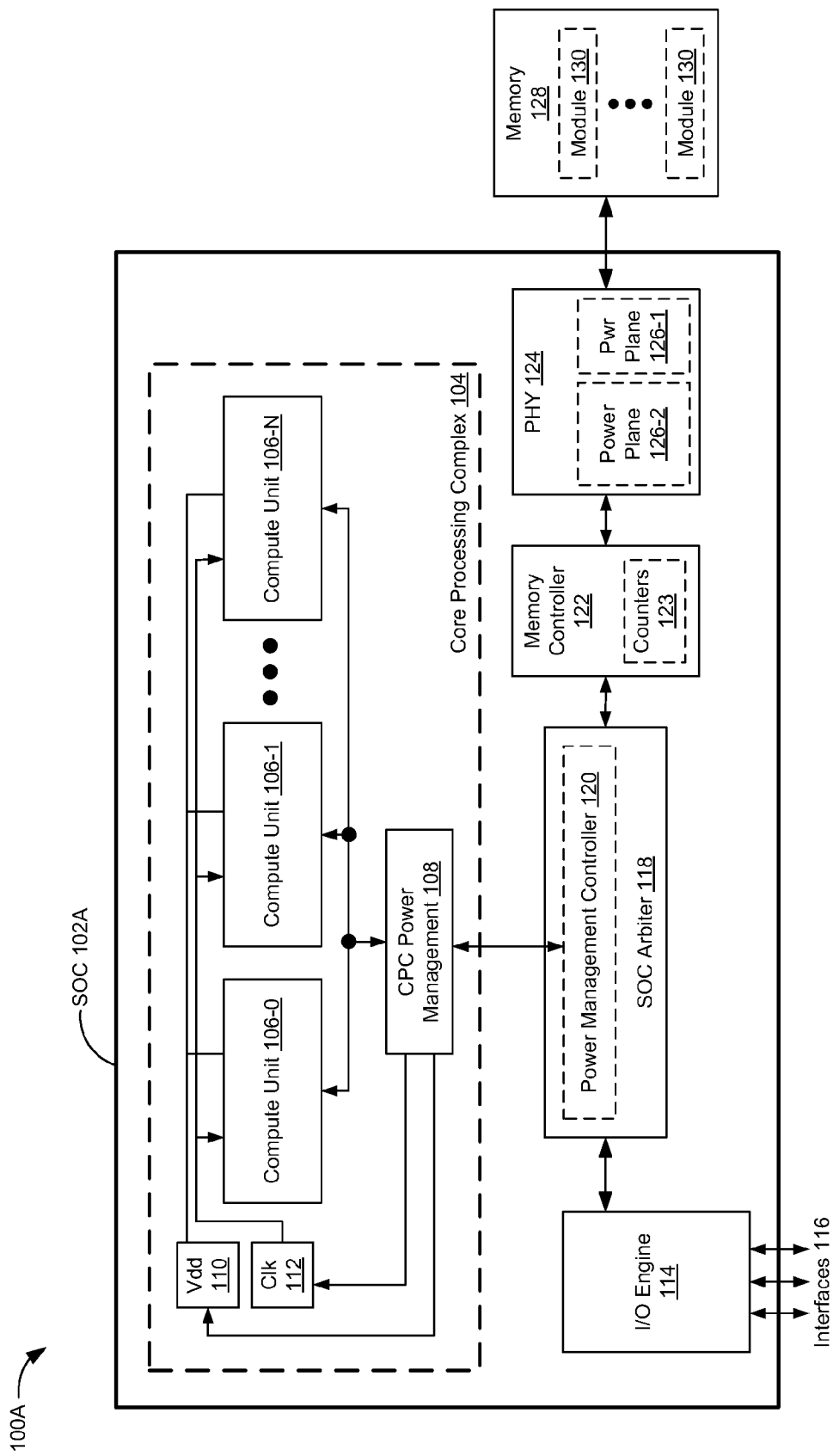
FIGS. 1A-1C are block diagrams of systems that include a system-on-a-chip coupled to a memory in accordance with some embodiments.

FIG. 1A is a block diagram of a system 100A that includes a system-on-a-chip (SOC) 102A coupled to a memory 128 in accordance with some embodiments. The SOC 102A is referred to as a system-on-a-chip because it is implemented in a single integrated circuit and therefore on a single semiconductor die, which is also referred to as a chip. A core processing complex (CPC) 104 in the SOC 102A includes a plurality of compute units 106-0 through 106-N, where N is an integer greater than or equal to zero. Each of the compute units 106-0 through 106-N is a discrete processing unit. In some embodiments, all or a portion of the compute units 106-0 through 106-N are processor cores (e.g., central processing unit (CPU) cores). Alternatively, one or more (e.g., all) of the compute units 106-0 through 106-N may be another type of processing unit (e.g., a graphics processing unit (GPU) or discrete portion thereof). The compute units 106-0 through 106-N may be homogeneous (e.g., may all be the same type of processor core) or heterogeneous (e.g., may include different types of processing cores and/or other discrete processing units). For example, the CPC 104 may be a CPU or a GPU, or may include both a CPU and a GPU.

An SOC arbiter 118 in the SOC 102A serves as an interface between the CPC 104, a memory controller 122, and an input/output (I/O) engine 114. The I/O engine 114 is coupled to and controls interfaces 116. Examples of interfaces 116 include, but are not limited to, Ethernet (e.g., gigabit Ethernet) interfaces, universal serial bus (USB) interfaces, and PCI Express (PCIe) interfaces. Peripheral devices may be coupled to the SOC 102A through the interfaces 116 and I/O engine 114.

The memory controller 122 couples to external memory 128 through a physical-layer device (PHY) 124. The memory 128 may be or include the main memory (e.g., implemented using dynamic random-access memory (DRAM) or other suitable memory technology) of the system 100A. In some embodiments, the memory 128 is double-data-rate (DDR) memory and the PHY 124 is a DDR PHY. The PHY 124 thus acts as an interface between the memory controller 122 and the memory 128. In some embodiments, the memory 128 includes a plurality of modules 130 (e.g., dual in-line memory modules (DIMMs)) or other memory devices. In some embodiments, the PHY 124 includes two power planes 126-1 and 126-2. The first power plane 126-1 receives a first voltage Vdd1 from a first power supply and the second power plane 126-2 receives a second voltage Vdd2 from a second power supply. The first power plane 126-1 powers I/O logic in the PHY 124, including circuitry connected to the I/O pads of the PHY 124. (The I/O pads of the PHY 124 connect to signal lines that couple the PHY 124 with the memory 128). The second power plane 126-2 powers other logic in the PHY 124 besides the I/O logic. Examples of the other, non-I/O logic in the PHY 124 include, but are not limited to, channel first-in-first-out buffers (FIFOs) and compensation logic.

Figure 1B:
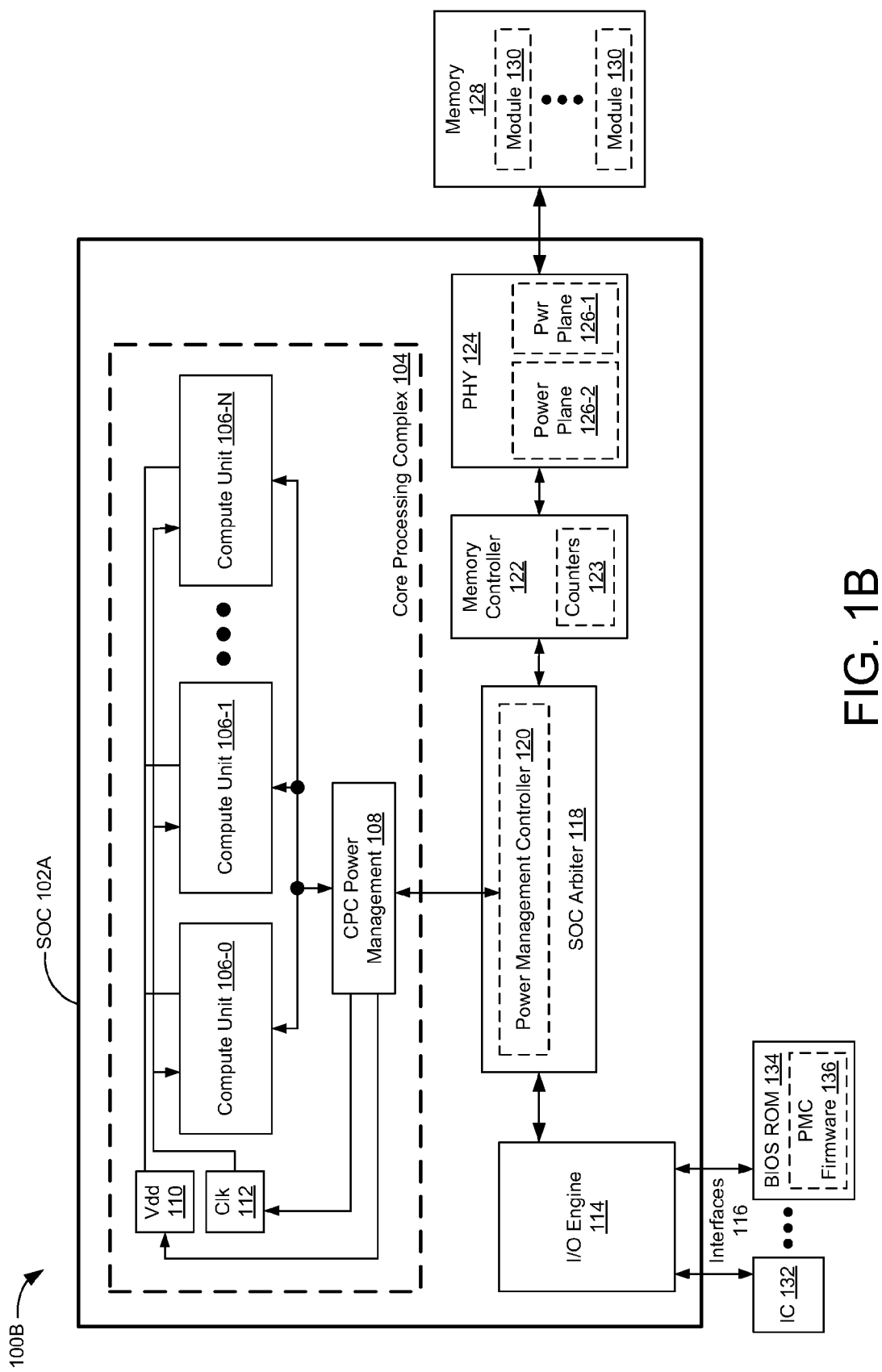

The SOC arbiter 118 includes a power management controller 120 that tracks power consumed by various components of the system 100A and allocates power to various components of the system 100A. The power management controller 120 performs this allocation based on various factors such as a total power budget for the system 100A, power budgets for various components, and performance demands. Power and performance states for the various components are selected based at least in part on the allocated power. For example, the power management controller 120 allocates power to the CPC 104 and/or to specific compute units 106-0 through 106-N in the CPC 104. The power management controller 120 also may allocate power to the interfaces 116 and/or to peripheral devices coupled to the SOC 102A through the interfaces 116. For example, FIG. 1B shows a system 100B in which an integrated circuit 132 is coupled to the SOC 102A through an interface 116, in accordance with some embodiments. (The system 100B is an example of the system 100A.) The power management controller 120 may allocate power to the integrated circuit 132. In one example, the integrated circuit 132 is a wireless communications chip (e.g., a WiFi chip) to which the power management controller 120 allocates power. The power allocated to the wireless communications chip at least partially determines a data rate at which the wireless communications chip operates. The power management controller may track the power consumption of the various components to which it allocates power.

The power management controller 120 also tracks power consumed by the PHY 124, which may consume a significant portion of the total power consumed in the system 100A. For example, the power management controller estimates power consumed by the PHY 124 and determines whether the estimated power consumption is less than a maximum power consumption (e.g., as specified by a power budget) for the PHY 124. If the estimated power consumption is less than the maximum power consumption, then the difference represents available power that may be allocated to one or more other components in the system 100A (e.g., in the system 100B, FIG. 1B).

In some embodiments, the power management controller 120 models the power consumed by the PHY 124 as a linear function with respect to the bandwidth used in accessing the memory 128. For example, the power management controller 120 estimates the power consumption associated with the first power plane 126-1 in the PHY 124 using a function Pwr1:

$$\text{Pwr1} = \text{Slope1} * Vdd1^2 * (\#\_\text{Mem\_Devices}) * \text{BW} + \text{Offset1} * Vdd1 \quad (1)$$

where BW is the memory bandwidth, #_Mem_Devices is a number of memory devices (e.g., a number of modules 130) in the memory 128, Vdd1 is the first voltage for the first power plane 126-1, and Slope1 and Offset1 are coefficients (e.g., with fixed values). Equation 1 is a linear function with respect to bandwidth, as shown. Equation 1 is also a linear function with respect to the number of memory devices (e.g., number of modules 130) in the memory 128, as shown, and allows the power management controller 120 to account for the size of the memory 128 when estimating power consumption of the PHY 124.

The power management controller 120 also estimates the power consumption associated with the second power plane 126-2 in the PHY 124 using a function Pwr2:

$$\text{Pwr2} = \text{Slope2} * Vdd2^2 * \text{BW} + \text{Offset2} * Vdd2 \quad (2)$$

where BW is the memory bandwidth, Vdd 2 is the second voltage for the second power plane 126-2, and Slope2 and Offset2 are coefficients (e.g., with fixed values). Equation 2, like Equation 1, is a linear function with respect to bandwidth, as shown. The power management controller 120 then sums the estimated power consumption associated with the first and second power planes 126-1 and 126-2 to determine a total estimated power consumption PHY_Pwr for the PHY 124:

$$\text{PHY\_Pwr} = \text{Pwr1} + \text{Pwr2} \quad (3).$$

In both Equation 1 and Equation 2, the first term represents dynamic power that scales with memory activity and thus with bandwidth, while the second term represents static power.

Figure 1C:
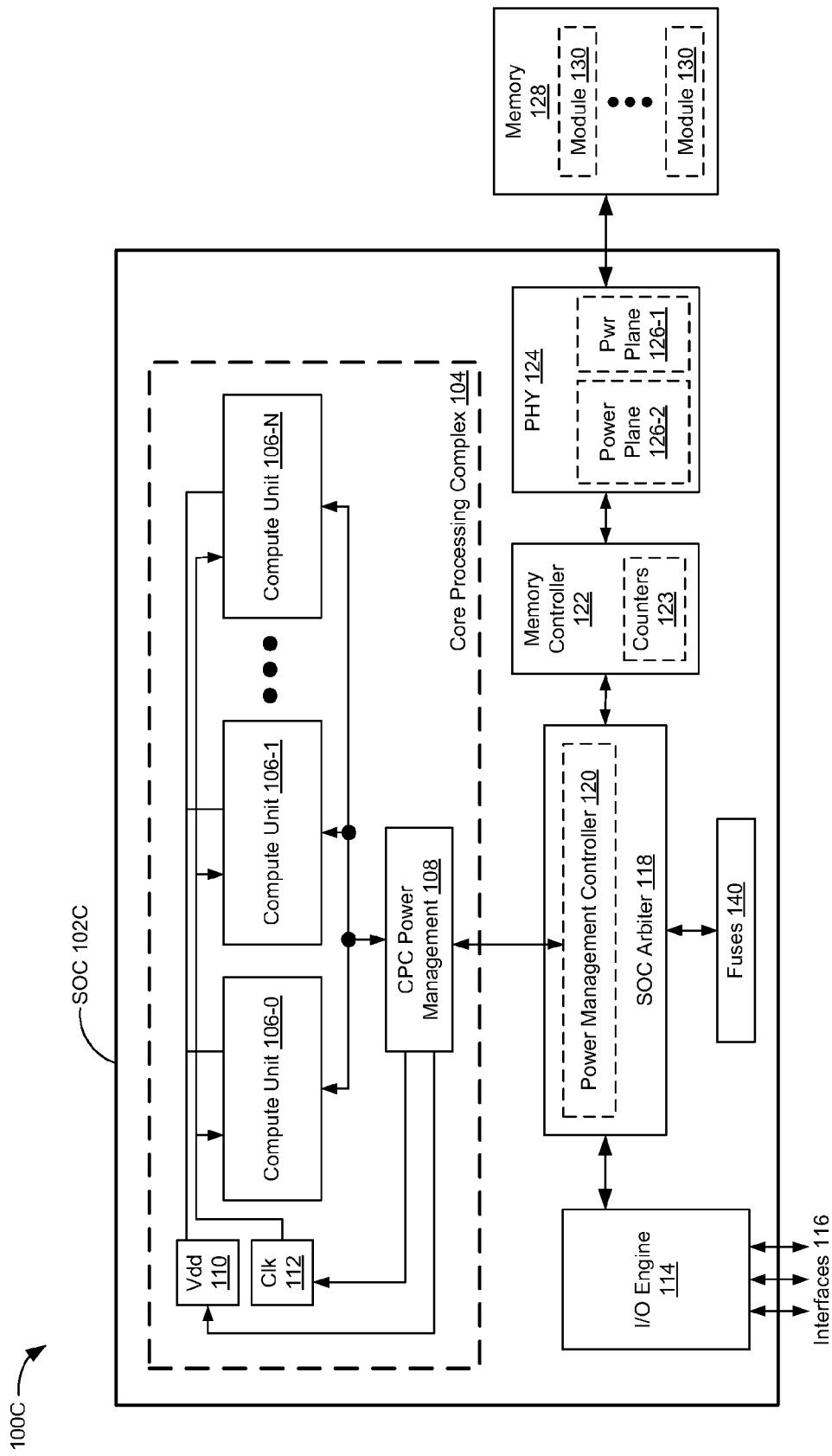

In some embodiments, the system 100A (e.g., the system 100B) includes one or more counters 123 that are used to determine the value of the memory bandwidth as used in Equations 1 and 2. In the example of FIGS. 1A-1C, the one or more counters 123 are included in the memory controller 122. Alternatively, the one or more counters 123 are included in the PHY 124.

In some embodiments, the power management controller 120 periodically estimates the power consumption of the PHY 124 and allocates available power to other components of the system 100A accordingly. The periodicity of the estimates may range, for example, between 0.5 milliseconds (ms) and 5 ms. In some examples the periodicity is 1 ms or on the order of 1 ms. The one or more counters 123 may be reset at the beginning of each period and read by the power management controller 120 at the end of each period.

For example, a counter 123 may count the number of clock cycles during which data transfers occur between the PHY 124 and the memory 128 (e.g., the number of clock cycles in which memory transactions are performed) in a given period. The value of the counter 123 is then compared to (e.g., divided by) a total number of clock cycles in the period to determine the memory bandwidth for the period. In another example, a counter 123 may count the number of memory transactions in which the memory 128 is accessed during a given period. The value of the counter 123 is then compared to (e.g., divided by) a maximum number of possible memory transactions in the period to determine the memory bandwidth for the period. Alternatively, the value of the counter 123 is weighted by a duration (e.g., an average duration) of each memory transaction and compared to (e.g., divided by) the duration of the period to determine the memory bandwidth. In yet another example, the one or more counters 123 include multiple counters 123, each of which counts a number of a respective type of memory transaction (e.g., reads to a single address, writes to a single address, block reads, block writes, etc.) during a given period. Values of the counters 123 are weighted by durations of their respective types of memory transactions, summed, and compared to a duration of the period to determine the memory bandwidth. In still another example, the one or more counters 123 include different counters 123 for different components of the system 100A that access the memory 128, such a first counter 123 for accesses by a CPU and a second counter 123 for accesses by a GPU. The memory bandwidth may be determined by summing the values of these counters 123 (e.g., in a suitably weighted manner). Other examples are also possible.

In some embodiments, dynamic frequency and/or voltage scaling is performed for the PHY 124. For example, Vdd1, Vdd2, and/or the frequency of the PHY 124 may be varied during operation (e.g., as specified by the power management controller 120). The power management controller 120 uses information regarding this frequency scaling and/or voltage scaling to dynamically update its estimates of the power consumption of the PHY 124. For example, the power management controller 120 updates the values of Vdd1, Vdd2, and/or BW in equations 1 and 2 based on the dynamic frequency-scaling and/or voltage scaling.

The coefficients Slope1, Offset1, Slope2, and Offset2 may be determined through characterization. This characterization may be performed, for example, for a statistical sample of SOCs 102A (e.g., a statistical sample that accounts for process variation) and then applied to all SOCs 102A of a given design, or may be performed individually for each SOC 102A (e.g., during manufacturing or during operation of the SOC 102A). To perform the characterization, an SOC 102A is placed in an idle mode in which the memory bandwidth is zero. The values Pwr1 and Pwr2 are measured in the idle mode (e.g., by the power management controller 120). The coefficients Offset1 and Offset2 are determined based on these measurements, because the first terms of Equations 1 and 2 are zero due to the zero memory bandwidth in the idle mode. The SOC 102A is then provided with a number of different workloads, each having a different memory bandwidth, and the values Pwr1 and Pwr2 are measured for each workload. The coefficients Slope1 and Slope2 are determined based on these measurements (e.g., using a curve-fitting technique such as least-squares).

In some embodiments there may be a plurality of low-power idle modes in which the PHY 124 may reside, each with a distinct corresponding value of Offset1 and Offset2. The values of Offset1 and Offset2 may be characterized for each mode as described. When determining the power consumed by the PHY 124, weighted averages of the values for the different idle modes are determined based on the amount of time the PHY 124 spent in each of the idle modes during a given period (e.g., as measured using counters 123).

In some embodiments, the functionality of the power management controller 120 is implemented in firmware. For example, the power management controller 120 includes a micro-controller that executes firmware stored on a non-transitory computer-readable storage medium in a non-volatile memory in the system 100A. In the example of the system 100B of FIG. 1B, a basic input/output system (BIOS) read-only memory (ROM) stores firmware 136 for the power management controller 120. The firmware 136 includes one or more programs with instructions that, when executed by the micro-controller, implement the functionality of the power management controller 120 as described herein. The firmware 136 may specify the values of the coefficients Slope1, Offset1, Slope2, and Offset2. Alternatively, the firmware 136 includes instructions for performing characterization to determine the values of the coefficients Slope1, Offset1, Slope2, and Offset2. The firmware 136 as executed by the microcontroller tracks the memory bandwidth (e.g., using appropriate variables or by periodically reading the one or more counters 123) and the number of modules 130 (or other memory devices) in the memory 128.

Alternatively, the functionality of the power management controller 120 is implemented in hardware. The values of the coefficients Slope1, Offset1, Slope2, and Offset2 may be stored in a non-volatile manner in the system 100A. In the example of FIG. 1C, an SOC 102C in a system 100C stores the values of the coefficients Slope1, Offset1, Slope2, and Offset2 in fuses 140 (e.g., electronically programmable fuses, referred to as eFuses) accessible to the power management controller 120. (The system 100C and SOC 102C are respective examples of a system 100A and SOC 100A.) In another example, the values of these coefficients are hard-wired into registers in the power management controller 120. In other examples, the hardware of the power management controller 120 is configured to perform characterization to determine the values of these coefficients, which are then stored (e.g., in registers in the power management controller 120).

As previously described, the power management controller 120 may allocate available power that is not used by the PHY 124 to the CPC 104, in addition to power that would be allocated to the CPC 104 regardless. In some embodiments, the CPC 104 includes CPC power management logic 108 to implement the power allocations. The CPC power management logic 108 controls a programmable power supply 110 and clock 112, or alternatively a plurality of programmable power supplies 110 and a plurality of clocks 112. (While the programmable power supply 110 and clock 112 are shown within the CPC 104, they may be outside of the CPC 104. In some embodiments, each programmable power supply 110 is external to the SOC 102A). The CPC power management logic 108 may specify the level of the power supply voltage Vdd provided by the programmable power supply 110 and the frequency of the clock signal provided by the clock 112. A given combination (e.g., predefined combination) of Vdd and clock frequency may be referred to as a performance state or P-state, in accordance for example with the Advanced Configuration and Power Interface (ACPI) specification. P-states may be determined based at least in part on power allocated to the CPC 104.

In the example of FIGS. 1A-1C, each of the compute units 106-0 through 106-N is coupled to the programmable power supply 110 and the clock 112. Changing the level of the power supply voltage Vdd provided by the programmable power supply 110 thus changes Vdd for all of the compute units 106-0 through 106-N. Similarly, changing the frequency of the clock signal provided by the clock 112 changes the clock frequency for all of the compute units 106-0 through 106-N. In other examples, different compute units 106-0 through 106-N may be coupled to different power supplies 110 and/or different clocks 112 (e.g., such that different P-states may be specified for different compute units).

In the example of FIGS. 1A-1C, the power management controller 120, memory controller 122, PHY 124, and I/O engine 114 are implemented on the same die as the CPC 104. Alternatively, the power management controller 120, memory controller 122, PHY 124, and/or I/O engine 114 may be implemented on a separate die than the CPC 140 (e.g., in a different package or stacked in the same package).

Figure 2:
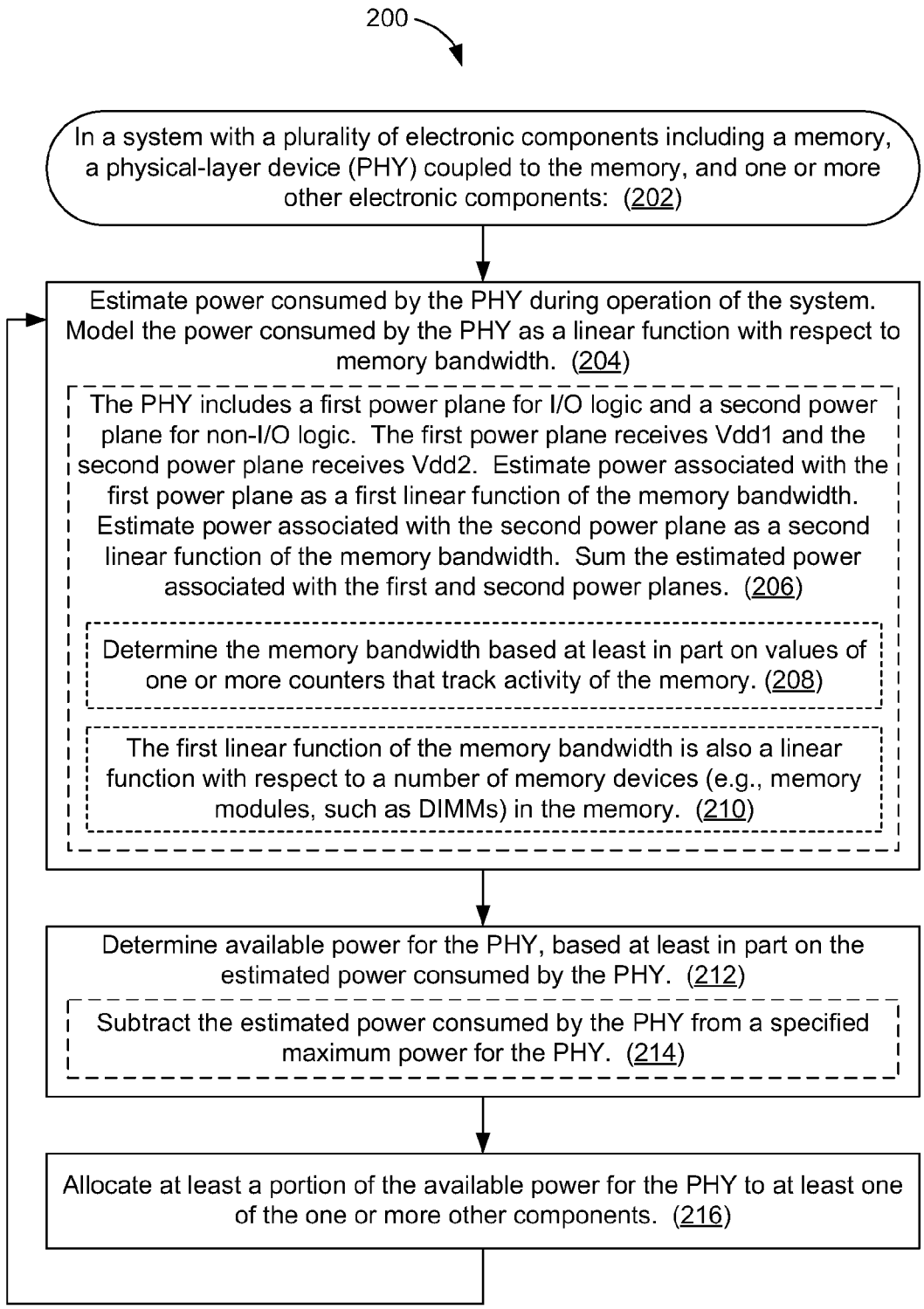
FIG. 2 is a flowchart showing a method of managing power in accordance with some embodiments.

FIG. 2 is a flowchart showing a method 200 of managing power in accordance with some embodiments. The method 200 is performed (202) in a system with a plurality of electronic components that include a memory (e.g., memory 128), a PHY (e.g., PHY 124) coupled to the memory, and one or more other electronic components. For example, the method 200 is performed in the system 100A (FIG. 1A), examples of which include the system 100B (FIG. 1B) and the system 100C (FIG. 1C). In some embodiments, the method 200 is performed by a power management controller 120 in the system 100A.

Power consumed by the PHY is estimated (204) during operation of the system. To make this estimate, the power consumed by the PHY is modeled (204) as a linear function with respect to memory bandwidth (e.g., using Equations 1, 2, and 3). In the example of the system 100A, the memory bandwidth is the bandwidth used in accessing the memory 128.

In some embodiments, the PHY includes a first power plane 126-1 for I/O logic and a second power plane 126-2 for non-I/O logic. The first power plane 126-1 receives Vdd1 and the second power plane 126-2 receives Vdd2. Power associated with the first power plane 126-1 is estimated (206) as a first linear function of the memory bandwidth (e.g., using Equation 1). Power associated with the second power plane 126-2 is estimated (206) as a second linear function of the memory bandwidth (e.g., using Equation 2). The estimated power associated with the first power plane 126-1 and the second power plane 126-2 is summed (206) (e.g., using Equation 3).

In some embodiments, the memory bandwidth is determined (208) based at least in part on values of one or more counters 123 that track activity of the memory.

In some embodiments, the first linear function of the memory bandwidth is (210) also a linear function with respect to a number of memory devices (e.g., memory modules 130, which are DIMMs in some examples) in the memory. For example, Equation 1 is linear with respect to the variable #_Mem_Devices.

Available power for the PHY is determined (212) based at least in part on the estimated power consumed by the PHY (as estimated in operation 204). For example, the estimated power consumed by the PHY is subtracted (214) from a specified maximum power for the PHY to determine the available power.

At least a portion of the available power for the PHY is allocated (216) to at least one of the one or more other components. Allocating the available power to at least one other component allows the performance of the component(s) to which the available power is allocated to be boosted. For example, the component(s) to which the available power is allocated may be operated at a higher voltage and/or higher frequency (e.g., operated in a higher P-state) than they otherwise would be. In some embodiments, all or a portion of the available power is allocated to the CPC 104 (e.g. to the entire CPC 104, or to one or more specified compute units of the compute units 106-0 through 106-N). For example, all or a portion of the available power is allocated to one or more processor cores, to a CPU, to a GPU, or to specific circuitry within a GPU. In another example, all or a portion of the available power is jointly allocated to a CPU and GPU. In some embodiments, all or a portion of the available power is allocated to one or more interfaces 116. In some embodiments, the PHY (e.g., PHY 124) is implemented in a first integrated circuit (e.g., SOC 102A) and all or a portion of the available power is allocated to a second integrated circuit (e.g., integrated circuit 132, FIG. 1B). These are merely some examples of allocating the available power; other examples are possible.

The method 200 may be performed repeatedly (e.g., in a periodic manner). For example, the method 200 may be performed once per period in a series of successive periods. In some embodiments, the periods have a duration that is in a range between approximately 0.5 us and 5 us (e.g., that is approximately 1 us).

While the method 200 includes a number of operations that appear to occur in a specific order, it should be apparent that the method 200 can include more or fewer operations. Two or more operations may be combined into a single operation and performance of two or more operations may overlap.

In some embodiments, all or a portion of the method 200 (FIG. 2) may be implemented in software (e.g., firmware). A non-transitory computer-readable storage medium may store instructions for performing all or a portion of the method 200. For example, the firmware 136 for the power management controller 120, as stored in the BIOS ROM 134 (FIG. 1B), may include one or more programs with instructions that, when executed by the power management controller 120, cause all or a portion of the method 200 to be performed. While the firmware 136 is shown in FIG. 1B as being stored in the BIOS ROM 134, it may alternately be stored in a different non-volatile memory (e.g., a ROM, Flash memory, hard-disk drive, etc.) that is either external to or within the SOC 102A.

The foregoing description, for purpose of explanation, has been described with reference to specific embodiments. However, the illustrative discussions above are not intended to be exhaustive or to limit all embodiments to the precise forms disclosed. Many modifications and variations are possible in view of the above teachings. The disclosed embodiments were chosen and described to best explain the underlying principles and their practical applications, to thereby enable others skilled in the art to best implement various embodiments with various modifications as are suited to the particular use contemplated.

What is claimed is:

1. A method of managing power, comprising:
    in a system comprising a plurality of electronic components including a memory, a physical-layer device (PHY) coupled as an interface between a memory controller and the memory, and one or more other electronic components:
        estimating power consumed by the PHY during operation of the system, the estimating comprising modeling the power consumed by the PHY as a linear function with respect to memory bandwidth;
        based at least in part on the estimating, determining available power for the PHY; and
        allocating at least a portion of the available power for the PHY to at least one of the one or more other components.

2. The method of claim 1, wherein the determining comprises subtracting the estimated power consumed by the PHY from a specified maximum power for the PHY.

3. The method of claim 1, wherein:
    the PHY comprises a first power plane for input/output (I/O) logic and a second power plane for non-I/O logic, the first power plane receiving a first voltage (Vdd1) and the second power plane receiving a second voltage (Vdd2); and
    the estimating comprises estimating power associated with the first power plane as a first linear function of the memory bandwidth, estimating power associated with the second power plane as a second linear function of the memory bandwidth, and summing the estimated power associated with the first and second power planes.

4. The method of claim 3, wherein:
the memory comprises a number of memory devices;
the first linear function of the memory bandwidth is:

$$Pwr1 = Slope1 * Vdd1^2 * (\#\_Mem\_Devices) * BW + Offset1 * Vdd1; \text{ and}$$

the second linear function of the memory bandwidth is:

$$Pwr2 = Slope2 * Vdd2^2 * BW + Offset2 * Vdd2;$$

wherein Pwr1 is the estimated power associated with the first power plane, Pwr2 is the estimated power associated with the second power plane, BW is the memory bandwidth, #_Mem_Devices is the number of memory devices, Slope1 is a first coefficient, Offset1 is a second coefficient, Slope2 is a third coefficient, and Offset2 is a fourth coefficient.

5. The method of claim 4, wherein the memory comprises a plurality of memory modules and the number of memory devices comprises a number of memory modules in the plurality of memory modules.

6. The method of claim 4, further comprising calculating the first coefficient, second coefficient, third coefficient, and fourth coefficient during operation of the system.

7. The method of claim 1, wherein:
the system comprises one or more counters to track activity of the memory; and
the method further comprises determining the memory bandwidth based at least in part on values of the one or more counters.

8. The method of claim 1, wherein:
the one or more other electronic components comprise a processor core; and
the allocating comprises allocating at least a portion of the available power for the PHY to the processor core.

9. The method of claim 1, wherein:
the one or more other electronic components comprise a central processing unit (CPU) and a graphics processing unit (GPU); and
the allocating comprises jointly allocating the available power for the PHY to the CPU and the GPU.

10. The method of claim 1, wherein:
the PHY is implemented in a first integrated circuit;
the one or more other electronic components comprise a second integrated circuit distinct from the first integrated circuit; and
the allocating comprises allocating at least a portion of the available power for the PHY to the second integrated circuit.

11. The method of claim 1, further comprising periodically repeating the estimating, determining, and allocating.

12. A system comprising a plurality of electronic components including:
a physical-layer device (PHY) to couple as an interface between a memory controller and a memory;
one or more other electronic components; and
a power management controller to:
estimate power consumed by the PHY by modeling the power consumed by the PHY as a linear function with respect to memory bandwidth;
determine available power for the PHY based at least in part on the estimated power consumed by the PHY; and
allocate at least a portion of the available power for the PHY to at least one of the one or more other components.

13. The system of claim 12, wherein:
the PHY comprises a first power plane for input/output (I/O) logic and a second power plane for non-I/O logic;
the first power plane is to receive a first voltage (Vdd1);
the second power plane is to receive a second voltage (Vdd2); and
the power management controller is to estimate power associated with the first power plane as a first linear function of the memory bandwidth, estimate power associated with the second power plane as a second linear function of the memory bandwidth, and sum the estimated power associated with the first and second power planes.

14. The system of claim 13, wherein:
the first linear function of the memory bandwidth is:

$$Pwr1 = Slope1 * Vdd1^2 * (\#\_Mem\_Devices) * BW + Offset1 * Vdd1; \text{ and}$$

the second linear function of the memory bandwidth is:

$$Pwr2 = Slope2 * Vdd2^2 * BW + Offset2 * Vdd2;$$

wherein Pwr1 is the estimated power associated with the first power plane, Pwr2 is the estimated power associated with the second power plane, BW is the memory bandwidth, #_Mem_Devices is a number of memory devices in the memory, Slope1 is a first coefficient, Offset1 is a second coefficient, Slope2 is a third coefficient, and Offset2 is a fourth coefficient.

15. The system of claim 12, further comprising one or more counters to track activity of the memory;
wherein the power management controller is to determine the memory bandwidth based at least in part on values of the one or more counters.

16. The system of claim 12, wherein the system further comprises a memory controller coupled to the PHY, the memory controller comprising the one or more counters.

17. A non-transitory computer-readable storage medium storing one or more programs configured for execution by a power management controller in a system that comprises a plurality of electronic components including the power management controller, a physical-layer device (PHY) to couple as an interface between a memory controller and a memory, and one or more other electronic components, the one or more programs comprising:
instructions to estimate power consumed by the PHY during operation of the system, comprising instructions to model the power consumed by the PHY as a linear function with respect to memory bandwidth;
instructions to determine available power for the PHY based at least in part on the estimated power consumed by the PHY; and
instructions to allocate at least a portion of the available power for the PHY to at least one of the one or more other components.

18. The computer-readable storage medium of claim 17, wherein:
the PHY comprises a first power plane for input/output (I/O) logic and a second power plane for non-I/O logic, the first power plane to receive a first voltage (Vdd1) and the second power plane to receive a second voltage (Vdd2); and
the instructions to estimate power consumed by the PHY comprise instructions to estimate power associated with the first power plane as a first linear function of the memory bandwidth, instructions to estimate power associated with the second power plane as a second linear function of the memory bandwidth, and instructions to sum the estimated power associated with the first and second power planes.

19. The computer-readable storage medium of claim 18, wherein:

the first linear function of the memory bandwidth is:

$$Pwr1 = Slope1 * Vdd1^2 * (\#\_Mem\_Devices) * BW + Offset1 * Vdd1; \text{ and}$$

the second linear function of the memory bandwidth is:

$$Pwr2 = Slope2 * Vdd2^2 * BW + Offset2 * Vdd2;$$

wherein Pwr1 is the estimated power associated with the first power plane, Pwr2 is the estimated power associated with the second power plane, BW is the memory bandwidth, #_Mem_Devices is a number of memory devices in the memory, Slope1 is a first coefficient, Offset1 is a second coefficient, Slope2 is a third coefficient, and Offset2 is a fourth coefficient.

20. The computer-readable storage medium of claim 17, wherein:

the system further comprises one or more counters to track activity of the memory; and the instructions to estimate power consumed by the PHY further comprise instructions to determine the memory bandwidth based at least in part on values of the one or more counters.

21. The method of claim 1, wherein the PHY comprises:

input-output I/O pads coupled to signal lines between the PHY and the memory;

I/O logic circuitry connected to the I/O pads; and non-I/O logic circuitry.

* * * * *